(12) United States Patent
Oriol et al.

(10) Patent No.: US 12,314,040 B2
(45) Date of Patent: May 27, 2025

(54) METHOD FOR MONITORING A FIRST MACHINE AND A SECOND MACHINE, SENSOR SET, AND USE OF A SENSOR SET FOR MONITORING A FIRST MACHINE AND A SECOND MACHINE

(71) Applicant: ABB Schweiz AG, Baden (CH)

(72) Inventors: Manuel Oriol, Zürich (CH); Maciej Orman, Malopolskie (PL); Pallavi Hujband, Bangalore (IN); Neethu Thusath Pradeep, Kerala (IN)

(73) Assignee: ABB SCHWEIZ AG, Baden (CH)

( * ) Notice: Subject to any disclaimer, the term of this patent is extended or adjusted under 35 U.S.C. 154(b) by 145 days.

(21) Appl. No.: 17/528,062

(22) Filed: Nov. 16, 2021

(65) Prior Publication Data

US 2022/0155761 A1 May 19, 2022

(30) Foreign Application Priority Data

Nov. 16, 2020 (EP) ..................................... 20207879

(51) Int. Cl.
*G05B 19/418* (2006.01)
*G01H 1/00* (2006.01)

(52) U.S. Cl.
CPC ......... *G05B 19/4185* (2013.01); *G01H 1/003* (2013.01); *G05B 19/4183* (2013.01); *G05B 19/41845* (2013.01); *G05B 19/41885* (2013.01)

(58) Field of Classification Search
CPC ............ G05B 19/4185; G05B 19/4183; G05B 19/41845; G05B 19/41885; Y02D 30/70;

(Continued)

(56) References Cited

U.S. PATENT DOCUMENTS 6,002,996 A 12/1999 Burks et al.
9,913,006 B1 * 3/2018 Wascat .................... H04W 4/80
(Continued)

FOREIGN PATENT DOCUMENTS

CN 103327581 A 9/2013
CN 104796972 A 7/2015
(Continued)

OTHER PUBLICATIONS

Extended European Search Report, issued by the European Patent Office, regarding corresponding patent application Serial No. 20207879.6; dated May 4, 2021, 8 pages.

*Primary Examiner* — Kamini S Shah
*Assistant Examiner* — Mohammed Shafayet
(74) *Attorney, Agent, or Firm* — Greenberg Traurig, LLP

(57) ABSTRACT

A method for monitoring a first machine and a second machine is described. The machines are rotating machines. Sensor devices are coupled to the machines. The method includes synchronizing a first sensor device and a second sensor device; sensing, by the first sensor device, an operating parameter of the first machine; and sensing, by the second sensor device, an operating parameter of the second machine. The sensing of the second operating parameter is synchronized to the sensing of the first operating parameter. The method further includes broadcasting, by the first sensor device, a data packet comprising the sensed operating parameter of the first machine; receiving, by the second sensor device, the data packet sent by the first sensor device; and calculating, by the second sensor device, a performance indicator from the received operating parameter of the first machine and the sensed operating parameter of the second machine.

17 Claims, 2 Drawing Sheets

(58) Field of Classification Search
CPC ......... H04W 52/0216; H04W 56/0015; H04W 84/18; H04Q 9/00; G01H 1/003; G01M 99/008
See application file for complete search history.

(56) References Cited

U.S. PATENT DOCUMENTS

| | | | |
|---|---|---|---|
| 2005/0240377 A1* | 10/2005 | Bibelhausen | G05B 23/0208 340/539.1 |
| 2012/0176941 A1* | 7/2012 | Bata | H04W 84/18 370/255 |
| 2013/0212420 A1* | 8/2013 | Lawson | G06F 16/9535 713/400 |
| 2018/0097353 A1 | 4/2018 | Von Sebo | |
| 2018/0120133 A1* | 5/2018 | Blank | G01D 18/002 |
| 2020/0182684 A1* | 6/2020 | Yoskovitz | G01R 33/02 |
| 2020/0336878 A1* | 10/2020 | Chieh Tseng | H04W 76/18 |
| 2021/0123835 A1* | 4/2021 | Glennon | H02J 50/001 |

FOREIGN PATENT DOCUMENTS

| | | |
|---|---|---|
| CN | 106128062 A | 11/2016 |
| CN | 108027358 A | 5/2018 |
| CN | 111465832 A | 7/2020 |
| EP | 4024147 A1 | 7/2022 |
| WO | 2018198111 A1 | 11/2018 |

* cited by examiner

METHOD FOR MONITORING A FIRST MACHINE AND A SECOND MACHINE, SENSOR SET, AND USE OF A SENSOR SET FOR MONITORING A FIRST MACHINE AND A SECOND MACHINE

Aspects of the invention relate to a method for monitoring a first machine and a second machine, in particular rotating machines, in particular a driving machine and a driven machine. Further aspects relate to a sensor set for monitoring a first machine and a second machine. Further aspects relate to the use of a sensor set for monitoring a first machine and a second machine. Further aspects of the invention relate to a method for synchronizing sensor devices and transmitting sensor data, and a sensor set implementing the method.

TECHNICAL BACKGROUND

Industrial machines, such as motors, pumps or mounted bearings, are key components in a wide range of facilities. Constant monitoring of such machines can improve the efficiency and lifetime of the plant equipment, and reduce unexpected downtime, maintenance and service interval frequency. The automated monitoring of such machinery can be performed with dedicated sensor devices, such as an ABB Ability™ Smart Sensor, which can provide a constant stream of data regarding the state of the monitored machine, and make the measured operating parameters available for remote access and evaluation, often in the form of performance indicators or alerts. The sensor devices are often battery-powered stand-alone devices with an operative lifetime of several years.

The monitored machinery often comprises several interacting components, for example a driving machine such as a motor can drive a downstream machine, such as a pump, over a drive shaft housed in a mounted bearing. If several components are monitored by a sensor device, each sensor device can obtain a separate set of monitored parameters. Some of the parameters of the interacting components, such as rotational speed, can be common to all the interacting components but are often more accurately measurable by one of the sensor devices than by the other sensor devices. However, the most accurate sensor data from one sensor device is typically not available to the other sensor devices. Furthermore, known sensor devices cannot be accurately synchronized or maintained in synchronization, and therefore do not allow the sensed data to be correlated in dynamic systems. Hence, the accurate sensor data cannot be used by any other sensor devices for determining accurate performance indicators based on this common parameter.

Thus, there is a need for an improved set of sensor devices that can efficiently exchange sensor data between the individual sensor devices.

SUMMARY OF THE INVENTION

In view of the above, according to claims 1 and 9, a method for monitoring a first machine and a second machine, and a sensor set are provided.

According to an aspect, a method for monitoring a first machine and a second machine is described. The first machine and the second machine are rotating machines. A first sensor device is coupled to the first machine for sensing an operating parameter of the first machine, and a second sensor device is coupled to the second machine for sensing an operating parameter of the second machine. The method includes synchronizing the first sensor device and the second sensor device; sensing, by the first sensor device, an operating parameter of the first machine; and sensing, by the second sensor device, an operating parameter of the second machine. The sensing of the second operating parameter is synchronized to the sensing of the first operating parameter. The method further includes broadcasting, by the first sensor device, a data packet comprising the sensed operating parameter of the first machine; receiving, by the second sensor device, the data packet sent by the first sensor device; and calculating, by the second sensor device, a performance indicator from the received operating parameter of the first machine and the sensed operating parameter of the second machine.

According to a further aspect, a sensor set with a first sensor device adapted for being coupled to a first machine, and a second sensor device adapted for being coupled to a second machine, is described. The first machine and the second machine are rotating machines. The first sensor device and the second sensor device are adapted for being synchronized to each other. The first sensor device includes a first sensor for sensing an operating parameter of the first machine, and a transmitter for transmitting a data packet. The data packet comprises the sensed operating parameter of the first machine. The second sensor device includes a second sensor for sensing, synchronized to the first sensor device, an operating parameter of the second machine, and a receiver for receiving, synchronized to the first sensor device, a data packet from the first sensor device, the data packet comprising an operating parameter of the first machine. The second sensor device is configured for calculating a performance indicator from the received operating parameter of the first machine and the sensed operating parameter of the second machine.

An advantage of the provided method and the provided sensor set is the ability to obtain a higher accuracy performance indicator of the second machine, since the operation parameter that was sensed by the first sensor device is now available to the second sensor device.

A further advantage is the improved accuracy when measuring dynamic systems, since the synchronization of the first sensor device and the second sensor device can ensure that the measurements of both sensor devices are performed at the same time.

A further advantage is the reduced power requirement of the second sensor device, since the synchronized receiving of the data packet from the first sensor device only requires powering the receiver of the second device for a limited time. Thus, the battery life of the device is increased.

Further advantages, features, aspects and details that can be combined with embodiments described herein are evident from the dependent claims, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Figure 1:
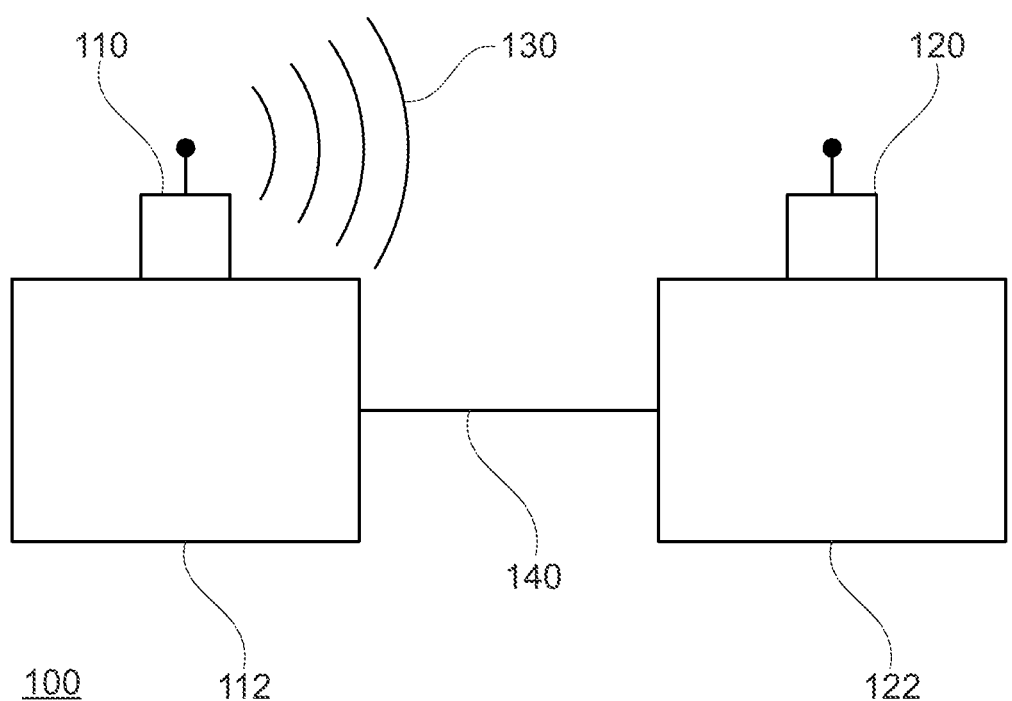
FIG. 1 is a schematic drawing of a sensor set as installed in a machine arrangement according to an embodiment

Referring to FIG. 1, according to embodiments, a sensor set 100 with a first sensor device 110 coupled to a first machine 112 and a second sensor device 120 coupled to a second machine 122 are shown. The first sensor device 110 and the second sensor device 120 are coupled to the first machine 112 and the second machine 122 and include a first sensor and a second sensor for sensing one or more operating parameters of the first machine 112 or the second machine 122. Sensing, according to this disclosure, can be understood as measuring a raw sensory input. Sensing, according to this disclosure, can further include processing a raw sensory input to obtain an operating parameter as a quantity derived from the raw sensor input, possibly in combination with other inputs. An operating parameter can be a parameter representing a state of the machine. The sensor devices 110, 112 can include one or more sensors, such as sensor elements or sensor arrangements, for sensing the operating parameter. Possible sensors can include a temperature sensor for sensing the temperature of the machine, an acoustic sensor for sensing an audible signal, such as a sound, a frequency or a noise produced by the machine, an accelerometer or a vibration sensor for sensing vibrations produced by the machine, or a magnetometer, for sensing a magnetic field, particularly a variable magnetic field, produced by the machine. The sensors can be included in a common housing of the sensor device. The sensors can provide raw sensor inputs or raw input data to the sensor device, and the sensor device can be configured for translating the raw input data into a parameter value, e.g. by performing signal conversions, calculations, analyses or transformations, e.g. Fourier transformation, bias correction or such. Two or more operating parameters or raw sensor inputs can be used to determine a performance indicator.

According to an embodiment, in an example, which is given here so to better understand the invention, an operating parameter representing the noise produced by a bearing can be combined with an operating parameter representing the temperature of the bearing to result in a bearing health indicator, the bearing health indicator being a performance indicator. In the example, a failing bearing, which often produces noise and heat due to increased friction, can be identified based on this a bearing health indicator.

According to embodiments, which can be combined with other embodiments described herein, the first sensor device 110 and the second sensor device are configured for being synchronized to each other. The synchronization can be performed according to a method described herein and/or any known method, particularly according to the method 200 described with reference to FIG. 2. For the sensor devices 110, 120 to obtain and maintain synchronization, the sensor devices 110, 120 can be configured to send and/or receive one or more synchronization packets. The synchronization packet can be transmitted via a wireless transmission, particularly a low-power radio frequency transmission. The synchronization packet can be included in a data packet according to a known wireless transmission protocol. The synchronization packet can be included in a Bluetooth® data packet, such as a Bluetooth® low energy advertisement packet. The sensor devices 110, 120 can include a transceiver for transmitting and receiving transmissions according to the wireless transmission protocol. The synchronization packet can be broadcast periodically, with an interval of between 1 ms up to 10 s.

According to embodiments, which can be combined with other embodiments described herein, the sensor devices 110, 120 can include an internal clock module. The internal clock module can be configured for using a received synchronization packet to synchronize the sensor device 110, 120 according to a synchronization time signal included in the synchronization packet, e.g. by setting an internal clock included in the internal clock module according to the synchronization time signal. The sensor devices 110, 120 can be configured for receiving synchronization packets from external sources, such as a dedicated synchronization device. The sensor devices 110, 120 can be configured to be connected in a network, such as a mesh network, and receive synchronization packets from a node within the network. The sensor devices 110, 120 can be nodes in the mesh network. The sensor devices can be configured to be hierarchically structured, for example, the first sensor device 110 can be configured to provide synchronization packets, e.g. by periodically broadcasting a synchronization packet, and the second sensor device 120 can be configured to receive, particularly periodically receive, a synchronization packet transmitted by the first sensor device 110. Synchronization can be maintained by periodically transmitting and receiving synchronization packets. The sensor devices 110, 120 can be considered synchronized when the internal clock module of the first sensor device 110 is set within ±5 seconds, particularly within ±2 seconds, particularly within ±1 second of the second sensor device 120.

According to embodiments, which can be combined with other embodiments described herein, the first sensor device 110 and the second sensor device 120 can sense a first operating parameter of the first machine 112 and a second operating parameter of the second machine 122 in a synchronized manner. A second sensor of the second device 120 sensing, synchronized to the first sensor device, an operating parameter of a second machine can be equivalent to the first sensor of the first device 110 sensing, synchronized to the second sensor device, an operating parameter of a first machine. The sensing can be considered synchronized when the first sensor device 110 and the second sensor device 120 sense the first operating parameter and the second operating parameter within ±5 seconds, particularly within ±2 seconds, particularly within ±1 second of each other. The synchronized sensing can be performed periodically. The synchronized sensing can include sensing the first operating parameter and the second operating parameter at a predefined time point known to both sensor devices. The predefined time point can be stored, e.g. in form of a list or a set of instructions, within both sensor devices. The predefined time point can be a periodic time point, such as, for example, a periodic time point defined as "every $n^{th}$ minute after the full hour" or "every n seconds after UTC timestamp x". Various other examples for defining periodic time points are known and can be equally suitable. The predefined time point can be programmed and stored in the sensor devices 110, 120, e.g. during first time initialization of the sensor devices. The predefined time point can be variable or reprogrammable during operation of the sensor devices. The predefined time point can be transmitted and/or received by the first sensor device 110 and/or the second sensor device 120, e.g. together with the synchronization data packet, or with a separate data packet, such as an initialization data packet.

According to embodiments, which can be combined with other embodiments described herein, synchronizing the first sensor device and the second sensor device can enable the sensor devices to perform a synchronized sensing of an operating parameter of the first machine and an operating parameter of the second machine.

According to embodiments, which can be combined with other embodiments described herein, synchronizing the first sensor device and the second sensor device can enable the sensor devices to perform the transmission of the operating parameter of the first machine (by the first sensor device) and the receiving and/or listening (by the second sensor device) in a synchronized manner.

According to embodiments, which can be combined with other embodiments described herein, the synchronized sensing of an operating parameter of the first machine and an operating parameter of the second machine can ensure a temporal correlation between the two sensed operating parameters. Particularly, when it is known that the sensed operating parameters correspond to the same state of the machine assembly, the synchronized sensed operating parameters can provide additional information compared to uncorrelated operating parameters.

According to embodiments, which can be combined with other embodiments described herein, the first and second machines 112, 122 are rotationally coupled to each other, so that a rotational motion of the first machine 112 (e.g., rotational speed of a shaft of the first machine) determines a rotational motion of the second machine 122 (e.g., rotational speed of a shaft of the second machine). For example, the shaft of the first machine 112 can be coupled to the shaft of the second machine 122, either directly or indirectly via a gearbox or the like. For example, the first machine 112 may be an electrical machine configured to rotationally drive the second machine 122. Thereby, a rotational speed measurement of the first machine 112 may be useful for estimating and/or validating the rotational speed measurement of the second machine 122. Such a configuration is especially advantageous if the first sensor device 110 has access to measurements not available to the second sensor device 120, e.g., to a magnetic field produced by the first machine 112. For example, if the first machine 112 drives the second machine 122 so that the second machine 122 does not produce a comparable magnetic field, the magnetic field measurement by the first sensor device 110 allows obtaining information about the rotational state not accessible to the second sensor device 120.

According to an embodiment, in one example, which is given here so to better understand the invention, the first operating parameter can be the rotational speed of the system, and the second operating parameter can be the acoustic spectrum of a driven pump. When both operating parameters have been sensed in a synchronized manner, i.e. at the same timepoint, it is known that the acoustic spectrum of the driven pump correlates to the rotational speed the pump was driven at. This is not the case if the operating parameters are not sensed in a synchronized manner, since the rotational speed could have changed between the first measurement and the second measurement.

As shown in FIG. 1, according to embodiments, the first sensor device 110 includes a transmitter for transmitting a data packet, and the second sensor device 120 includes a receiver for receiving a data packet. The transmission of the data packet can be performed according to a method described herein, particularly according to the method 200 described with reference to FIG. 2. The data packet can be transmitted via a wireless transmission, particularly a low-power radio frequency transmission. The data packet can be included in a data packet according to a known wireless transmission protocol. The data packet can be included in a Bluetooth® data packet, such as a Bluetooth® low energy advertisement packet. The sensor devices 110, 120 can include a transceiver, such as a Bluetooth® transceiver module, for transmitting and receiving transmissions according to the wireless transmission protocol. The data packet can be broadcast periodically, with an interval of between 1 ms up to 10 s. The transmitter, receiver and/or transceiver for transmitting the data packet can be the same transmitter, receiver and/or transceiver for transmitting the synchronization packet.

According to an embodiment, which can be combined with other embodiments described herein, the data packet and the synchronization packet can be transmitted using a digital, packet-based transmission protocol. The transmission protocol may be a low-energy protocol, with a maximum transmission power of up to 100 mW, particularly of up to 10 mW. The protocol may have a low range, particularly lower than 50 m, particularly lower than 20 m.

In FIG. 1, a transmission 130 of a data packet from the first sensor device 110 is shown schematically. The transmission 130 is depicted as being directional towards the second sensor device 120, however, the transmission 130 can be an omnidirectional, non-exclusive broadcast, e.g. the transmission can be received by other devices. The transmission includes a data packet. The data packet includes a sensed operating parameter of the first machine 110. The second sensor device 120 is configured for receiving the data packet. According to the embodiments shown in FIG. 1, the second sensor device 120 is synchronized to the first sensor device 110, and the receiving of the data packet is synchronized to the transmitting of the data packet.

According to embodiments, which can be combined with other embodiments described herein, the sensor devices 110, 120 can be battery powered devices. The sensor devices 110, 120 can be small, standalone, wireless, and/or portable devices, particularly embedded devices. The sensor devices 110, 120 can be IP67 rated, e.g., can be be provided in a single, common sealed housing. A battery can be included, together with other components of the sensor device 110, 120, in the sealed housing. A combination of these features can be beneficial, since the individual devices can be easily installed without requiring any additional infrastructure, such as power lines or wired data connections, and can operate even in harsh environments. However, after the battery power is depleted, the sensor device may need to be replaced. Thus, there is an incentive to minimize power consumption of the sensor devices and thereby improve the available battery life, ideally such that the operative life-time of a sensor device is in the range of several years.

According to embodiments, which can be combined with other embodiments described herein, an effective way to minimize power consumption of a sensor device according to embodiments described herein, particularly a second sensor device 120 configured for receiving data packets from a first sensor device, is to minimize the time in which the receiver of the second sensor device is actively listening for incoming transmissions. This can be accomplished by configuring the sensor devices 110, 120 to perform the following operations: Switching the second sensor device 120 into a listening mode at a predetermined listening time interval, wherein the second sensor device 120 is in the listening mode from the beginning of the listening time interval to the end of the listening time interval, and wherein the second sensor device 120 has the listening mode disabled outside the listening time interval; and broadcasting, by the first sensor device 110, the data packet within the predetermined listening time interval. The listening mode can be a mode in which the receiver of the second sensor device 120 actively listens for incoming transmissions. Disabling the listening mode can set the second sensor device 120 into a mode in which no power is consumed by the receiver of the second sensor device, i.e. a non-listening time interval. The listening time interval can be periodically repeated. The listening time interval can be short compared to the non-listening time interval. The listening time interval can be at most 10% of the total time, preferably at most 1% of the total time.

According to an embodiment, which can be combined with other embodiments described herein, both the first sensor device 110 and the second sensor device 120 can operate in a synchronized manner to perform both the transmitting and the receiving within the predetermined listening time interval. The synchronization of the first device and the second device has been discussed previously. Like the predefined time point, the predetermined listening time interval can be programmed and stored in the sensor devices 110, 120, e.g. during first time initialization of the sensor devices. The predetermined listening time interval can be variable or reprogrammable during operation of the sensor devices. The predetermined listening time interval can be transmitted and/or received by the first sensor device 110 and/or the second sensor device 120, e.g. together with the synchronization data packet, or with a separate data packet, such as an initialization data packet.

According to an embodiment, which can be combined with other embodiments described herein, the predetermined listening time interval can be defined as an interval following the predefined time point for sensing an operating parameter, e.g. an operating parameter of the first machine 112 sensed by the first sensor device 110. The predetermined listening time interval can be defined as a time interval with a predefined length following the sensing of the operating parameter of the first machine 112. The predetermined listening time interval can begin with a delay after the predefined time point, e.g. to allow the processing in the first sensor device 110 of raw sensor data into an operating parameter. The second sensor device 120 can disable the listening mode under certain conditions even when the second sensor device is within the listening time interval, e.g. when a data packet has already been successfully received. In this case, the successful receipt of a data packet can end the listening time interval.

According to an embodiment, in one example, which is given here so to better understand the invention, the first sensor device 110 and the second sensor device 120 are synchronized and the predefined time point is known to both devices. At the predefined time point, the first sensor device 110 senses an operating parameter of a first machine 112, and the second sensor device senses, synchronized to the first sensor device, an operating parameter of a second machine. Simultaneously, the second sensor device 120 is switched into a listening mode for a predetermined listening time interval. The first sensor device 110 performs a calculation on the sensed raw sensor data to obtain the operating parameter of the first machine 112 and transmits the operating parameter of the first machine 112 as soon as the result of the calculation, i.e. the operating parameter, has been obtained. The second device 120 waits and listens for the period of time that is required by the first sensor device 110 to perform the calculation and to transmit the data packet. After the second sensor device 120 has received the data packet, the second sensor device disables 120 the receiver to save power. The second device 120 now has available the operating parameter of the first machine and the operating parameter of the second machine. The operating parameters can be further processed by the second device as described in further detail below.

According to an embodiment, which can be combined with other embodiments described herein, the first sensor device 110 and/or the second sensor device 120 can be configured for using the listening time interval to exchange further data during the listening time interval, particularly for transmitting and/or receiving synchronization packets to establish or maintain synchronization.

According to an embodiment, which can be combined with other embodiments described herein, the second sensor device 120 can, under some circumstances, enable a listening mode even when the second device 120 is not within the listening time interval. In one example, the second device 120 can, if it has been determined that no synchronization has been performed or that synchronization has likely been lost, remain in the listening mode until a synchronization packet has been received.

According to an embodiment, which can be combined with other embodiments described herein, the first sensor device 110 and/or the second sensor device 120 can be configured for combining different types of data into a generic data packet, such that a generic data packet can include any combination of a synchronization time signal, an operating parameter, a performance indicator, or further data types.

According to an embodiment, which can be combined with other embodiments described herein, the use of a listening time interval as described herein can beneficially reduce the energy consumption of the sensor device, particularly the second sensor device 120. Furthermore, the listening time interval can allow the sensor devices 110, 120 to be set up such that the transmissions can be expected only at certain predefined time-points. This can beneficially reduce the required transmission bandwidth, so that even a large number of devices can broadcast on the same frequency, since each broadcast is limited to a short, known time window.

Referring to FIG. 1, according to an embodiment, the first machine 112 and the second machine 122 are rotating machines. Rotating machines can be machines that include rotating components. Rotating machines can be machines that interact with rotating components, such as rotating components of other machines. The machines 112, 122 can be coupled by a drive 140. The drive 140 can be a driveshaft, a drive belt, a transmission or another known component for transmitting mechanical energy between a first machine and a second machine. The first machine 112 can be a driving machine, such a s a motor, particularly an electric motor, such as a low voltage electric motor. The second machine 122 can be a driven machine or a driven component of a second machine, such as a pump, a bearing or a gearbox. The first machine 112 can drive the second machine 122.

According to embodiments, which can be combined with other embodiments described herein, the first sensor device 110 can include a magnetometer, i.e. a sensor for sensing a magnetic field, and the first machine 112 can be an electric motor such as a low voltage electric motor. The electric motor can be a driving machine for driving another machine, i.e. a driven machine. The first sensor device 110 can be configured for utilizing the magnetometer for sensing variations in the magnetic field produced by the motor. The magnetic field variations can be a result of the variation of the magnetic field within the electric motor and can thus correlate with the rotational speed of the motor. According to embodiments, which can be combined with other embodiments described herein, the sensing of the magnetic field produced by the first machine 112 by the first sensor device 110 can yield a high accuracy operating parameter of the first machine. The operating parameter can be the rotational speed of the first machine 112. The rotational speed of the first machine 112 can correlate with the rotational speed of the second machine 122, particularly if the first machine 112 is a driving machine and the second machine 122 is a driven machine driven by the first machine 112.

According to embodiments, which can be combined with other embodiments described herein, the second sensor device 120 is configured for calculating a performance indicator from the received operating parameter of the first machine and the sensed operating parameter of the second machine. The performance indicator can be a value representing a state of the second machine 122. The performance indicator can be a key performance indicator. In an embodiment, the performance indicator can be used to determine abnormal machine states, which can e.g. be utilized for predicting imminent machine failure. Thus, a highly accurate performance indicator can beneficially improve the detection of such abnormal machine states.

Referring to FIG. 1, in one example, which is given here so to better understand the invention, the first machine 112 and the second machine 122 are coupled by a drive 140 and thus have a common operating parameter, i.e. the rotational speed of the machine 112, the drive 140 and the second machine 122. In the example, the first machine 112 is an electric motor and the first sensor device 110 includes a magnetometer. The first sensor device 110 can accurately measure the rotational speed of the electric motor, which is also the rotational speed of the second machine 122. The rotational speed thus is a common operating parameter of the first machine 112 and the second machine 122. In the example, the second machine 122 is a pump, and the second sensor device 120 has an acoustic sensor. The acoustic sensor data can only inaccurately measure the rotational speed. In the example, the presence of certain frequencies at specific rotational speeds has been determined to correlate with advanced wear of the pump, and it is known that maintenance should be performed when advanced wear has been detected. Thus, for determining an accurate performance indicator based on the acoustic sensor data from the second sensor device 120 and the rotational speed of the pump, transmitting the common operating parameter "rotational speed" from the first sensor device 110 to be received by the second sensor device 120 can beneficially allow a more accurate determination of the performance indicator, provided that the measurements of the first sensor device 110 and the second sensor device 120 are performed in a synchronized manner.

According to embodiments, which can be combined with other embodiments described herein, the sensor set can comprise a first sensor device and a plurality of second sensor devices. The plurality of second sensor devices can comprise any second sensor device according to embodiments described herein. A second sensor device of the plurality of second sensor devices can receive, independent from other second sensor devices, a transmission from the first sensor device. The transmission can be the same transmission being received by multiple second sensor devices at the same time. The transmission can include a synchronization packet as described herein. The transmission can include a data packet as described herein. Thus, multiple second sensor devices can be synchronized to the first sensor device, and multiple second sensor devices can be provided with an operating parameter of the first machine.

Figure 2:
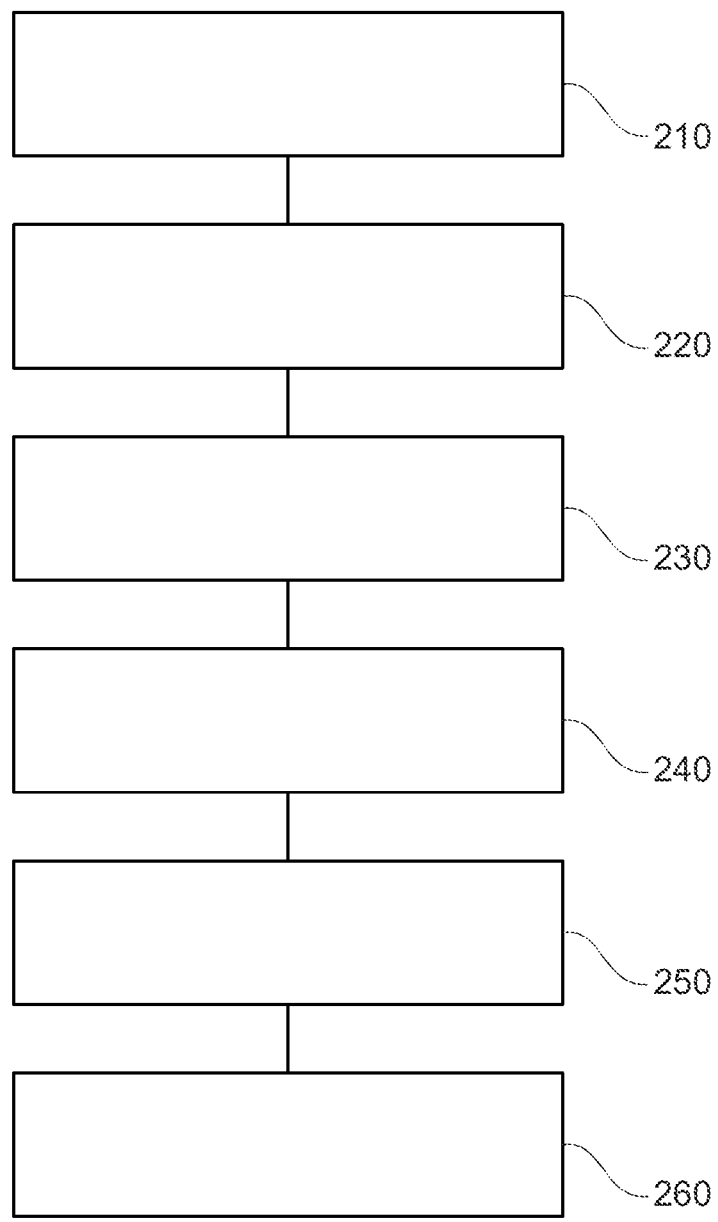
FIG. 2 is a schematic flow chart of a method for monitoring a first machine and a second machine according to an embodiment

Referring to FIG. 2, according to an embodiment, a method 200 for monitoring a first machine 112 and a second machine 122 is shown. For the method 200, a first sensor device 110 is coupled to the first machine 112 for sensing an operating parameter of the first machine 110, and a second sensor device 120 is coupled to the second machine 122 for sensing an operating parameter of the second machine 122. The first sensor device 110 can be a first sensor device 110 according to embodiments described herein, and the second sensor device 120 can be a second sensor device according to embodiments described herein. Particularly, the first sensor device 110 and the second sensor device 120 can be a first sensor device 110 and a second sensor device 120 according to the sensor set 100 shown in FIG. 1. The method can include any operation as described in the context of embodiments of the sensor devices 110, 120. The first machine and the second machine are rotating machines and can be machines 112, 122 according to embodiments described herein.

According to embodiments, which can be combined with other embodiments described herein, at operation 210, the first sensor device is synchronized with the second sensor device. Synchronization, herein also referred to as synchronizing, can be performed according to the synchronization described for the sensor devices 110, 120. Synchronization can include transmitting, to the first sensor device 110 and/or the second sensor device 120, a synchronisation packet comprising a synchronisation time signal. The synchronization can include the first sensor device 110 broadcasting a synchronization packet to be received by the second sensor device 120.

According to embodiments, which can be combined with other embodiments described herein, at operation 220, the first sensor device 110 senses an operating parameter of the first machine 112, and at operation 230, the second sensor device 120 senses an operating parameter of the second machine 122. Operations 220 and 230 are synchronized, such that the sensing of the operating parameters of the first machine and the second machine is preferably performed within ±5 seconds, particularly within ±2 seconds, particularly within ±1 second.

According to embodiments, which can be combined with other embodiments described herein, at operation 240, the method 200 includes broadcasting, by the first sensor device 110, a data packet comprising the sensed operating parameter of the first machine 112, and at operation 250 includes receiving, by the second sensor device 120, the data packet sent by the first sensor device. Broadcasting 240 and receiving 250 can be performed according to the broadcasting and receiving of a data packet as previously described herein for embodiments of the sensor devices 110, 120. The broadcasting 240 and the receiving 250 can be performed in a synchronized manner. The broadcasting 240 and the receiving 250 can be performed within a predetermined listening time interval. The predetermined listening time interval can be determined based on the synchronisation time signal.

According to embodiments, which can be combined with other embodiments described herein, at operation 240, the method 200 includes calculating, by the second sensor device 120, a performance indicator from the received operating parameter of the first machine 112 and the sensed operating parameter of the second machine 122. The performance indicator can be a key performance indicator. The performance indicator can represent a state of the second machine 122.

According to embodiments, which can be combined with other embodiments described herein, the method 200 can include the second sensor device 120, after having calculated the performance indicator, transmitting a data packet comprising the performance indicator to a receiving device. The second sensor device 120 can include a transmitter for transmitting the data packet comprising the performance indicator. The receiving device can comprise a network interface for connecting the receiving device to a data network, wherein the receiving device is operatively connected to the network interface for either carrying out a command received from the data network, and/or sending a data packet comprising the performance indicator and/or device status information to the data network. The receiving device can be transient, e.g. the receiving device can be a smartphone carried by a technician. When no receiving device is available, a number of data packets comprising a performance indicator can be stored within the second sensor device 120. The data packets can be sent in bulk when requested by the receiving device. The receiving device can be permanently installed and receive and send the data packet to the data network in real time.

According to embodiments, which can be combined with other embodiments described herein, the invention includes the uses of a sensor set 100 according to an embodiment described herein in a method 200 according to an embodiment described herein.

According to an aspect, a sensor set according to any of the embodiments specified herein is described, further comprising a network interface for connecting the first sensor device and/or the second sensor device of the sensor set to a data network, wherein the first sensor device or the second sensor device is operatively connected to the network interface for at least one of carrying out a command received from the data network and sending device status information to the data network.

According to an aspect, a sensor set according to any of the embodiments specified herein is described, wherein the first sensor device is paired with the second sensor device, and wherein the receiver of the second sensor device is configured for selectively receiving only packets from a paired broadcasting transmitter. Pairing a broadcasting transmitter can include the second device selectively accepting data packets from the paired broadcasting transmitter, and selectively ignoring data packets from an unpaired broadcasting transmitter. In one example, the first sensor device can be paired with the second sensor device if the second sensor device only accepts broadcast data packets that have included the MAC-address of the transmitter of the first sensor device.

Next, aspects relating to a network interface are described.

According to an aspect, the first sensor device and/or the second sensor device may further comprise a network interface for connecting the device to a data network, in particular a global data network. The data network may be a TCP/IP network such as Internet. The first sensor device and/or the second sensor device is operatively connected to the network interface for carrying out commands received from the data network. The commands may include a control command for controlling the device to carry out a task such as performing a measurement or transmitting the latest performance indicator. In this case, the first sensor device and/or the second sensor device is adapted for carrying out the task in response to the control command. The commands may include a status request. In response to the status request, or without prior status request, the first sensor device and/or the second sensor device may be adapted for sending a status information to the network interface, and the network interface is then adapted for sending the status information over the network. The commands may include an update command including update data. In this case, the first sensor device and/or the second sensor device is adapted for initiating an update in response to the update command and using the update data.

The data network may be an Ethernet network using TCP/IP such as LAN, WAN or Internet. The data network may comprise distributed storage units such as Cloud. Depending on the application, the Cloud can be in form of public, private, hybrid or community Cloud.

According to a further aspect, the first sensor device and/or the second sensor device comprises a processing unit for converting a raw sensor signal into a digital signal. The digital signal can be an operating parameter.

REFERENCE NUMERALS

100 Sensor set
110 First sensor device
112 First machine
120 Second sensor device
122 Second machine
130 Transmission
140 Drive
200 Method
210 Synchronizing
220 Sensing
230 Sensing
240 Broadcasting
250 Receiving
260 Calculating

The invention claimed is:

1. A method for monitoring a first machine and a second machine, the method comprising:
synchronizing a first sensor device and a second sensor device,
wherein the first sensor device is coupled to the first machine and the second sensor device is coupled to the second machine;
wherein the first machine and the second machine are rotating machines coupled by a drive, wherein the first machine is a driving rotating machine and the second machine is a driven rotating machine;
wherein the first sensor device is configured to sense an operating parameter of the first machine;
wherein the second sensor device is configured to sense an operating parameter of the second machine;
sensing, by the first sensor device, the operating parameter of the first machine;
sensing, by the second sensor device, the operating parameter of the second machine,
wherein the sensing of the operating parameter of the second machine is synchronized to the sensing of the operating parameter of the first machine;
wherein the operating parameter of the first machine and the operating parameter of the second machine are a common operating parameter;
broadcasting, by the first sensor device, a data packet comprising the sensed operating parameter of the first machine;

receiving, by the second sensor device, the data packet sent by the first sensor device; and calculating, by the second sensor device, a performance indicator from the sensed operating parameter of the first machine in the received data packet and the sensed operating parameter of the second machine,
wherein the performance indicator represents a state of the second machine.

2. The method according to claim 1, wherein the method comprises:

switching the second sensor device into a listening mode at a predetermined listening time interval, wherein the second sensor device is in the listening mode from the beginning of the predetermined listening time interval to the end of the predetermined listening time interval, and wherein the second sensor device has the listening mode disabled outside the predetermined listening time interval; and broadcasting, by the first sensor device, the data packet within the predetermined listening time interval.

3. The method according to claim 2, wherein the synchronizing comprises transmitting, to the first sensor device, the second sensor device, or to the first sensor device and the second sensor device, a synchronization packet comprising a synchronization time signal, and wherein the predetermined listening time interval is determined based on the synchronization time signal.

4. The method according to claim 1, wherein the second sensor device, after having calculated the performance indicator, transmits a second data packet comprising the performance indicator to a receiving device.

5. The method according to claim 4, wherein the receiving device comprises a network interface for connecting the receiving device to a data network, wherein the receiving device is operatively connected to the network interface for at least one of:

carrying out a command received from the data network; and sending a third data packet comprising the performance indicator, device status information, or the performance indicator and the device status information to the data network.

6. The method according to claim 1, wherein the synchronizing is performed by broadcasting a synchronization packet from the first sensor device.

7. The method according to claim 1, wherein the data packet and/or a synchronization packet are transmitted according to a wireless communication protocol such as the Bluetooth® low energy protocol.

8. The method according to claim 1, wherein the first sensor device and the second sensor device are nodes in a mesh network.

9. The method according to claim 1, wherein the first sensor device comprises a magnetic field sensor for sensing a magnetic field of the first machine, and wherein the second sensor device does not utilize a magnetic field sensor measurement for sensing the operating parameter of the second machine.

10. The method according to claim 1, wherein the first sensor device senses the common operating parameter with a higher accuracy than the second sensor device.

11. The method according to claim 1,
wherein the first machine or the second machine is one or more of the following:
an electric motor;
a low-voltage electric motor;
a pump;
a bearing; or
a gearbox.

12. The method according to claim 1,
wherein the first sensor device or the second sensor device comprises one or more of the following sensor(s):
a temperature sensor;
an acoustic sensor;
an accelerometer; or
a magnetometer.

13. A sensor set comprising:
a first sensor device adapted for being coupled to a first machine; and
a second sensor device adapted for being coupled to a second machine,
wherein the first machine and the second machine are rotating machines coupled by a drive, wherein the first machine is a driving rotating machine and the second machine is a driven rotating machine; and
wherein the first sensor device and the second sensor device are adapted for being synchronized to each other,
the first sensor device comprising:
a first sensor for sensing an operating parameter of the first machine, and
a transmitter for transmitting a data packet,
wherein the data packet comprises the sensed operating parameter of the first machine; and
the second sensor device comprising:
a second sensor for sensing, synchronized to the first sensor device, an operating parameter of the second machine, and
a receiver for receiving, synchronized to the first sensor device, the data packet from the first sensor device, the data packet comprising the sensed operating parameter of the first machine;
wherein the operating parameter of the first machine and the operating parameter of the second machine are a common operating parameter;
wherein the second sensor device is configured for calculating a performance indicator from the received operating parameter of the first machine in the received data packet and the sensed operating parameter of the second machine,
wherein the performance indicator represents a state of the second machine.

14. The sensor set according to claim 13, wherein the first sensor device comprises a magnetic field sensor for sensing a magnetic field of the first machine, and wherein the second sensor device does not utilize a magnetic field sensor measurement for sensing the operating parameter of the second machine.

15. The sensor set according to claim 13, wherein the first sensor device senses the common operating parameter with a higher accuracy than the second sensor device.

16. The sensor set according to claim 13,
wherein the first machine or the second machine is one or more of the following:
an electric motor;
a low-voltage electric motor;
a pump;
a bearing; or
a gearbox.

17. The sensor set according to claim 13,
wherein the first sensor device or the second sensor device comprises one or more of the following sensor(s):
a temperature sensor;
an acoustic sensor;

an accelerometer; or
a magnetometer.

\* \* \* \* \*